(12) United States Patent
Ji et al.

(10) Patent No.: US 8,446,893 B2
(45) Date of Patent: May 21, 2013

(54) ENHANCED COEXISTENCE BEACON PROTOCOL (ECBP) FOR PRECISE INTERCELL SYNCHRONIZATION OF OVERLAPPING WIRELESS BASE STATIONS

(75) Inventors: Baowei Ji, Plano, TX (US); William Joseph Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1003 days.

(21) Appl. No.: 11/957,292

(22) Filed: Dec. 14, 2007

(65) Prior Publication Data

US 2008/0159258 A1 Jul. 3, 2008

Related U.S. Application Data

(60) Provisional application No. 60/871,174, filed on Dec. 21, 2006.

(51) Int. Cl.
*H04J 3/06* (2006.01)

(52) U.S. Cl.
USPC .......................................... 370/350; 370/324

(58) Field of Classification Search ........................ None
See application file for complete search history.

(56) References Cited

U.S. PATENT DOCUMENTS

| | | | |
|---|---|---|---|
| 5,668,804 A * | 9/1997 | Suonvieri | 370/331 |
| 5,864,549 A | 1/1999 | Honkasalo et al. | |
| 5,930,722 A * | 7/1999 | Han et al. | 455/502 |
| 5,959,982 A * | 9/1999 | Federkins et al. | 370/336 |

(Continued)

FOREIGN PATENT DOCUMENTS

| | | |
|---|---|---|
| EP | 0592 209 A1 | 4/1994 |
| KR | 1020020000720 A | 1/2002 |

(Continued)

OTHER PUBLICATIONS

Botteron et al, Effects of System and Environment Parameters on the Performance of Network-Based Mobile Station Position Estimators, Jan. 2004, IEEE Transactions on vehicular Technology, vol. 53, No. 1, pp. 163-180.*

(Continued)

*Primary Examiner* — Bunjob Jaroenchonwanit

(57) ABSTRACT

A method for synchronizing overlapping cells covered by different base stations include obtaining a propagation delay between a first base station and a second base station, scheduling by the first base station a selected one of first users located in a first cell covered by the first base station to transmit a first data packet which is a part of a transmission data frame, transmitting at the selected one the first users a transmission offset indicating the difference in a time domain between the beginning of the transmission data frame and the first data packet, in response to the reception of the first data packet, recording a reception offset at a selected one of second users located in a second cell covered by the second base station, the reception offset indicating the difference in time domain between the beginning of a reception data frame and the first data packet, transmitting at the selected one of the second users the reception offset to the second base station, calculating at the second base station a frame slide by adding the transmission offset and the propagation delay, and subtracting the reception offset, and synchronizing the first cell and the second cell based upon the calculated frame slide.

23 Claims, 10 Drawing Sheets

U.S. PATENT DOCUMENTS

| | | | | |
|---|---|---|---|---|
| 6,049,538 | A * | 4/2000 | Scott | 370/347 |
| 6,091,941 | A * | 7/2000 | Moriyama et al. | 455/126 |
| 6,141,337 | A * | 10/2000 | Uta et al. | 370/350 |
| 6,275,518 | B1 * | 8/2001 | Takahashi et al. | 375/135 |
| 6,332,069 | B1 * | 12/2001 | Zhao et al. | 455/12.1 |
| 6,359,869 | B1 | 3/2002 | Sonetaka | |
| 6,377,565 | B1 * | 4/2002 | Puckette, IV | 370/337 |
| 6,388,997 | B1 * | 5/2002 | Scott | 370/280 |
| 6,631,142 | B2 * | 10/2003 | Miyamoto et al. | 370/508 |
| 6,993,009 | B2 * | 1/2006 | Kelly et al. | 370/350 |
| 7,031,295 | B2 * | 4/2006 | Schafer | 370/350 |
| 7,483,425 | B2 * | 1/2009 | Wego et al. | 370/391 |
| 7,643,515 | B2 * | 1/2010 | Willenegger | 370/508 |
| 7,656,855 | B2 * | 2/2010 | Ghassemzadeh et al. | 370/350 |
| 2002/0094781 | A1 * | 7/2002 | Wreschner et al. | 455/63 |
| 2002/0160787 | A1 * | 10/2002 | Chen et al. | 455/456 |
| 2004/0137927 | A1 * | 7/2004 | Mun | 455/509 |
| 2004/0142692 | A1 * | 7/2004 | Schwarz et al. | 455/442 |
| 2007/0124593 | A1 * | 5/2007 | Kim et al. | 713/171 |
| 2008/0062957 | A1 * | 3/2008 | Narasimha et al. | 370/350 |
| 2009/0054075 | A1 * | 2/2009 | Boejer et al. | 455/456.1 |
| 2009/0151457 | A1 * | 6/2009 | Iizuka | 73/622 |
| 2009/0181689 | A1 * | 7/2009 | Lee et al. | 455/450 |
| 2009/0252048 | A1 * | 10/2009 | Liang et al. | 370/252 |

FOREIGN PATENT DOCUMENTS

| | | |
|---|---|---|
| KR | 1020020038562 A | 5/2002 |
| WO | WO 99/17470 | 4/1999 |
| WO | WO 99/57826 | 11/1999 |
| WO | WO 99/65163 | 12/1999 |

OTHER PUBLICATIONS

Haas et al, Two-Dimentional Differential Demodulation for OFDM, Apr. 2003, IEEE Transactions on Communications, vol. 51, No. 4, pp. 580-586.*

International Search Report dated on Apr. 7, 2008 for corresponding International Application No. PCT/KR2007/006741.

European Search Report dated Apr. 8, 2010 in connection with European Application No. 07024772.1.

* cited by examiner

ENHANCED COEXISTENCE BEACON PROTOCOL (ECBP) FOR PRECISE INTERCELL SYNCHRONIZATION OF OVERLAPPING WIRELESS BASE STATIONS

CLAIM OF PRIORITY

This application makes reference to, incorporates the same herein, and claims all benefits accruing under 35 U.S.C. §119 from a provisional application earlier filed in the U.S. Patent & Trademark Office on 21 Dec. 2006 and there duly assigned Ser. No. 60/871,174.

BACKGROUND OF THE INVENTION

1. Field of the Invention

The present invention relates to a method for synchronizing overlapping cells over the air, and more particularly, to a method for precisely synchronizing overlapping cells by considering a propagation delay between a transmitter and a receiver.

2. Description of the Related Art

Time Division Duplex (TDD) applies time-division multiplexing to separate outward and return signals. Likewise, Frequency Division Duplex (TDD) applies frequency-division multiplexing to separate outward and return signals. For both FDD and TDD systems, it is recommended that all Base Stations (BSs) are time synchronized with respect to a common network timing signal. In an event of loss of the network timing signal, BSs should continue to operate and should automatically resynchronize to the network timing signal when the network timing signal is recovered.

Self-Coexistence occurs when multiple wireless systems of the same type exist at the same time (i.e., coexistence). In the case of IEEE 802.22, Self-Coexistence means coexistence of multiple overlapping IEEE 802.22 cells.

Precise network time synchronization is essential in general TDD systems, especially for Self-Coexistence situations. For example, when two units of Customer Premises Equipment, CPE_a and CPE_b are located in an overlapping cell area between two BSs BS_a and BS_b, if the two BSs are not synchronized, an uplink transmission between CPE_a and BS_a could destroy the downlink receiving between CPE_b and BS_b. In addition, precise network time synchronization is required to support a soft-handoff, the mobility management, inter cell communications and locating. Moreover, in an IEEE 802.22 system, for reliable spectrum sensing, it is desirable for neighboring cells to be quiet at the same time in order to establish a system-wide quiet period. The more precisely the neighboring cells synchronize, the less guard time is needed in order to align system-wide quite period pr coexistence slots.

In IEEE 802.22, a method for synchronizing overlapping base stations over the air was disclosed. In this method, however, it was assumed that a propagation delay between two units of user equipment was negligible. This assumption, however, is not always legitimate. In fact, a 10 Km distance between two units of user equipment may result in about 33 μsec of propagation delay, which is certainly not negligible. Therefore, it is important to take the propagation delay into account when performing time synchronization.

SUMMARY OF THE INVENTION

It is therefore an object of the present invention to provide an improved method and apparatus for data transmission.

It is another object to provide an improved method and apparatus for data transmission to achieve precise time synchronization, especially in intra-BS and in inter-BS communications.

It is still another object to provide a method and apparatus able to enhance self-coexistence and synchronization between overlapping base stations.

According to one aspect of the present invention, a method for synchronizing overlapping cells is provided, in which a first data packet and a transmission offset indicating the difference in a time domain between the beginning of a transmission data frame and the first data packet is transmitted at a first node. The first node is one of a first base station and a first user. The first user is located in a first cell covered by the first base station. In response to the reception of the first data packet, a reception offset indicating the difference in time domain between the beginning of a frame at the second base station and the first data packet is recorded at a second user located in a second cell covered by a second base station. Then the reception offset is transmitted at the second user to the second base station. A propagation delay between the first node and the second user is subsequently obtained. A frame slide is calculated at the second base station by adding the transmission offset and the propagation delay, and subtracting the reception offset. Finally, the first cell and the second cell is synchronized based upon the calculated frame slide.

The step of obtaining the propagation delay between the first node and the second user may include transmitting at the first node a data packet carrying information regarding the geographical location of the first node; in response to the reception of the data packet, calculating at the second user the propagation delay of the data packet based on the information regarding the location of the first node; and transmitting at the second user the propagation delay to the second base station.

When one of the first node and the second user does not have knowledge of geographical location of itself, the propagation delay between the first node and the second user may be calculated using round-trip communication without the information regarding the geographical location of the first node.

The step of obtaining the propagation delay between the first node and the second user may include generating and broadcasting a location database containing geographical location information of a plurality of users located within the first cell in association with corresponding identifiers; transmitting via the first user a data packet carrying an identifier of the first user; in response to the reception of the data packet, retrieving at the second user the geographical location information of the first user from the location database in dependence upon the identifier; calculating at the second user a propagation delay in dependence upon the information regarding the location of the first user; and transmitting at the second user the propagation delay to the second base station.

The step of obtaining the propagation delay between the first node and the second user may include selecting by the first base station, a subset of first users for data transmission, with the first users being located in the first cell covered by the first base station; contenting by the subset of first users for transmitting a first reference data packet in a first time interval; transmitting by a certain one of the first users which won the contention, the first reference data packet; selecting by the second base station, a subset of second users for data reception, with the second users being located in the second cell covered by the second base station; in response to reception of the first reference data packet, contenting by the selected subset of second users for transmitting a second reference data packet in a second time interval; transmitting by a certain one of the second users which won the contention, the second reference data packet; calculating at the certain one of the first users a propagation delay between the certain one of the first users and the certain one of the second users; and transmitting at the certain one of the first users the propagation delay to the second base station. The certain one of the first users may transmit a third reference data packet. The selected one of the first users may compensate a processing delay of the first data packet when establishing cell synchronization.

The step of obtaining the propagation delay between the first node and the second user may include scheduling by the first base station the first user to transmit a first reference data packet; scheduling by the second base station the second user to receive the first reference data packet; scheduling by the second base station the second user to transmit a second reference data packet; and in response to reception of the second reference data packet, calculating at the first user a propagation delay of the reference data packet; transmitting at the first user the propagation delay to the second base station.

The first cell and the second cell may be overlapped.

According to another aspect of the present invention, a wireless communication system may be constructed with a first base station defining a first cell; a second base station defining a second cell. The second base station is synchronized with the first base station, by: scheduling by the first base station a selected one of a plurality of first users located within the first cell to transmit a first data packet which is a part of a transmission data frame; transmitting at the selected one of the first users a transmission offset indicating the difference in a time domain between the beginning of the transmission data frame and the first data packet; in response to the reception of the first data packet, recording a reception offset at a selected one of a plurality of second users located within the second cell, the reception offset indicating the difference in time domain between the beginning of a frame at the second cell and the first data packet; transmitting at the selected one of the second users the reception offset to the second base station; obtaining a propagation delay between the selected one of the first users and the selected one of the second users; calculating at the second base station a frame slide by adding the transmission offset and the propagation delay, and subtracting the reception offset; and synchronizing the first cell and the second cell based upon the calculated frame slide.

When the one of the second users has knowledge of geographical location of itself, the one of the first users may transmit the second data packet carrying information regarding a distance between the one of the first users and the one of the second users.

According to still another aspect of the present invention, a method for synchronizing overlapping cells is provided, in which a first data packet with location information of a first node and a transmission offset indicating the difference in a time domain between the beginning of a transmission data frame and the first data packet in a first cell is transmitted by the first node. Upon receiving the data packet by a second node, the second node records a reception offset indicating the difference in time domain between the beginning of a frame and the first data packet in a second cell. Then a propagation delay between the first node and the second node is obtained based on the location information of the first node. Finally, a frame slide is calculated by the second node a frame slide as adding the transmission offset and the propagation delay, and subtracting the reception offset.

According to a further aspect of the present invention, a wireless communication system may be constructed with a first node constituting a first cell and a second node constituting a second cell. The second node is synchronized with the first node by: transmitting by the first node a first data packet with location information of the first node and a transmission offset indicating the difference in a time domain between the beginning of a transmission data frame and the first data packet in the first cell; receiving the data packet by the second node, and recording a reception offset indicating the difference in time domain between the beginning of a frame and the first data packet in the second cell; obtaining a propagation delay between the first node and the second node based on the location information of the first node; and calculating by the second node a frame slide as adding the transmission offset and the propagation delay, and subtracting the reception offset.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the accompanying drawings.

This application incorporates by reference the IEEE 802.22: Draft Standard for Wireless Regional Area Networks Part 22.

Figure 1:
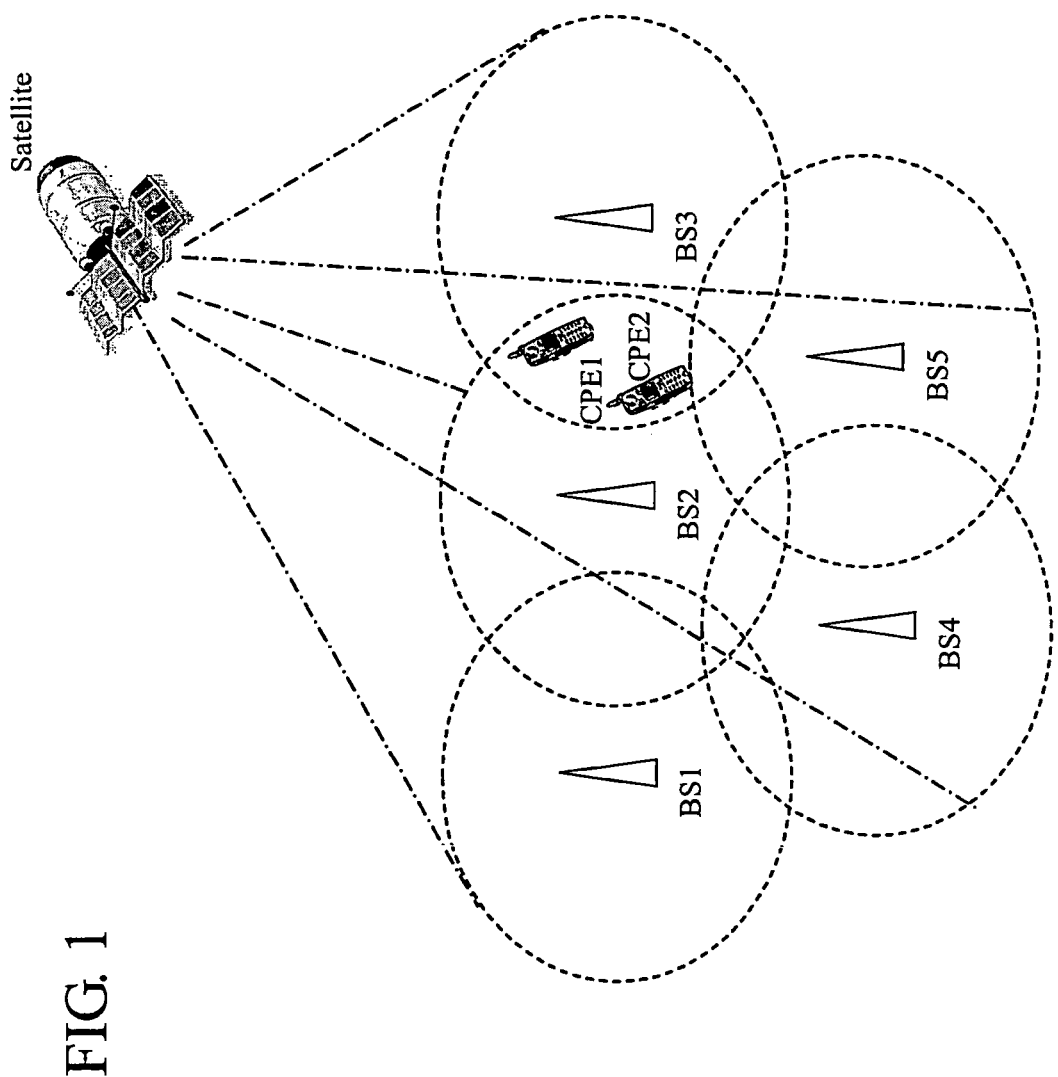
FIG. 1 illustrates an example of typical cellular (including IEEE 802.22) deployment configuration.

It has been observed in §6.21.2 of IEEE 802.22 standards, that contrary to other IEEE 802 standards where self-coexistence issues are only considered after the specification essentially is finalized, the IEEE 802.22 takes the proactive approach (as specified in its Requirements Document) and mandates that the MAC should include self-coexistence protocols and algorithms as part of the initial standard conception and definition. As depicted in FIG. 1, multiple 802.22 BSs and CPEs may operate in the same vicinity and, provided appropriate measures are taken at the air interface level, self-interference may render the 802.22 system useless. Even if directional antennas are used at the CPEs (although this may be implementation dependent), self-coexistence issues are not at all overcome. This is further aggravated by the fact that the range of 802.22 coverage can go up to 100 Km, and hence its interference range and impact on other collocated 802.22 cells is larger than in any other existing unlicensed technology.

FIG. 1 illustrates a scenario for coexistence transmission. Both Customer Premises Equipment_a (CPE_a) 105 and CPE_b 106 are located in an overlapping area between Cell_a 103 covered by Base Station_a (BS_a) 101 and Cell_b 104 covered by BS_b 102. CPE_a 105 transmits a Coexistence Beacon Protocol (CBP) packet in response to the direction of BS_a 101. CPE_b 106 receives the CBP packet and relays the message to its BS_b. The propagation delay between BS_a 101 and CPE_a 105 is $\tau 1$; the propagation delay between BS_b 102 and CPE_b 106 is $\tau 2$; and the propagation delay between CPE_a 105 and CPE_b 106 is $\tau 3$.

There are two types of beacon frames that can be used for intra-BS and inter-BS communication, and it is defined as the superframe header, which is transmitted by the BS in the beginning of every new superframe. The BS beacon is transmitted only by the BS. For inter-BS (alternatively, inter-WRAN) communication, CBP packets are employed and which can be transmitted by CPEs and BSs.

CBP packets are transmitted with the goal of improving self-coexistence amongst nearby IEEE 802.22 cells. These packets are transmitted under the control of the BS during an active self-coexistence window and share the same beacon MAC header. Since the goal of CBP packets is to improve self-coexistence, these CBP packets are sometimes refereed to as self-coexistence beacons.

Overall, the CBP packets provide information about the current cell as well as the CPE's traffic flows with its BS. Specifically, conveying the information about the traffic flows of a CPE with its BS is the responsibility of the Beacon IE, which is carried in the CBP packet payload and should appear in every CBP packet transmitted by a CPE.

CBP packets can carry in the payload one or more information elements. The CBP packets transmitted by CPEs should carry at least one beacon IE in their payload, since the beacon IE provides the basic information required to enable self-coexistence. CBP packets transmitted by the CPE may also carry a single DC/US Boundary IE. CBP packets transmitted by the BS should carry at least one DS/US Boundary IE, and may also carry one or more Beacon IE.

The Beacon IE provides necessary and sufficient information about the CPE's traffic reservations with the BS (CPEs with no traffic reservations with the BS need not transmit CBP packets). At least one Beacon IE should be included in every CBP packet transmitted by CPEs. Stations (either CPEs or BSs) belonging to other IEEE 802.22 BSs and who receive a CBP packet, can then improve coexistence amongst BSs through a variety of mechanisms such as interference-free scheduling.

To cope up with the serious self-interference issues that may arise in a real deployment scenario, the CBP protocol should be employed. The CBP is a best-effort protocol based on coexistence beacon transmissions. Given the mechanism for synchronization of overlapping BSs and also the fact that, as noted below, CPEs do not continuously stay locked to a BS, successful delivery of coexistence beacon transmissions has high probability.

Several mechanisms may be implemented on top of CBP, such as the renter/offerer algorithm and etiquette for channel assignment.

Figure 2:
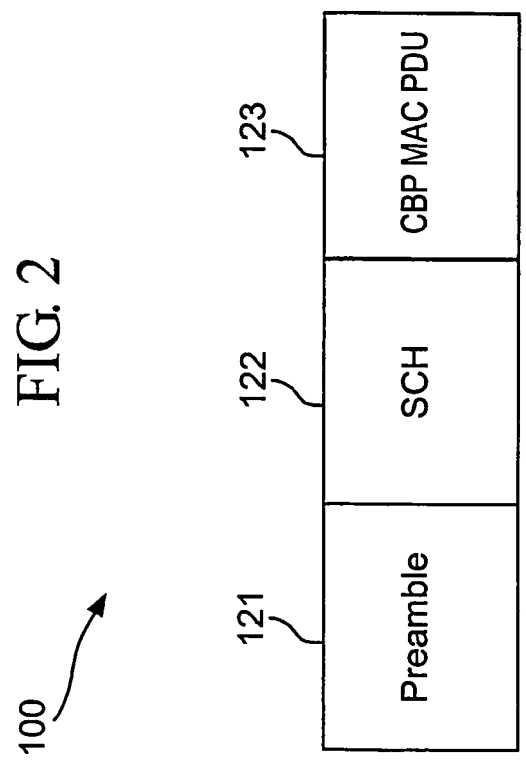
FIG. 2 illustrates the structure of a CBP packet defined in IEEE 802.22.

The structure and transmission of a CBP packet is shown FIG. 2. As shown in FIG. 2, a CBP packet 100 includes a preamble 121, a SCH 122, and a CBP MAC Protocol Data Unit (PDU) 123. CBP packet 100 starts with a preamble 121 which should be common across all IEEE 802.22 networks, and which is different from the superframe preamble. After preamble 121, follows the SCH 122 transmission. By transmitting both SCH 121 (which contains information about the IEEE 802.22 cell) and the CBP MAC PDU 123 (which contains information about the CPE reservations with its BS), the transmitting CPE conveys all necessary information to allow for better self-coexistence.

In CBP, 802.22 entities (i.e., CPEs and BSs) are capable of transmitting beacons which provide its recipients enough information to achieve satisfactory and good coexistence amongst overlapping 802.22 cells. These beacons are intended for inter-cell communication and carry specific information about a CPE's cell of attachment and downstream/upstream bandwidth allocations with the BS.

In CMAC, coexistence beacons are scheduled through the use of Coexistence Interval Usage Code (IUC) (both Passive and Active) which can be specified in UpStream (US)-MAP and DownStream (DS)-MAP messages. When scheduling a coexistence beacon, the connection ID contained in the MAP IE indicates which CPEs should send the beacon within the specified scheduled time. This connection ID can be either unicast (e.g., a CPE's primary connection ID), multicast (i.e., a multicast management connection ID), or even the broadcast ID. In case of multicast, the BS can implement clustering algorithms that improve spectrum utilization and maximize the effectiveness of the coexistence beacons, as multiple CPEs would transmit a coexistence beacon during the same scheduled time. Irrespective of the type of connection ID, the CPE should always verify if the connection ID specified by the BS includes itself or not. This will determine the CPE's behavior during the scheduled Coexistence IUC.

The Coexistence IUC defines a period of time where channel access is contention based. In other words, during this time CPEs should use the contention access mechanism (see 0) to gain access to the medium and transmit the coexistence beacon. The reason why a contention-based access mechanism is preferred for sending coexistence beacons is that it maximizes the spectrum usage. In the majority of cases, it is anticipated that the BS will not schedule just a single CPE to transmit beacons, but rather will attempt to improve coexistence by scheduling multiple CPEs to send beacons within the same time span (multicast management connections can be used for this purpose). Furthermore, when combined with the clustering algorithms, the efficiency of this contention basing is maximized because, for the same Coexistence IUC, the BS will only schedule CPEs that do not belonging to the same physical cluster.

In order to maximize the probability that coexistence beacons are received from other collocated 802.22 cells, a CPE does not stay locked to the BS at all times during a frame. A CPE will only be locked to the BS whenever it is scheduled to receive/send data from/to the BS as is indicated through the US-MAP and DS-MAP messages. At all other times during the frame, the CPE will be listening to the medium and searching for a coexistence beacon. Thus, the probability of success and efficiency of the CBP is drastically increased. In case a CPE loses synchronization with BS while listening/receiving a coexistence beacon, it should regain synchronization in the beginning following frame, which will cause few, if any, side effects.

Another mechanism that can be used by the BS to look out for CBP beacons is to schedule the Coexistence UIC in a Passive Mode. Essentially, the Passive Mode defines a time where the CPEs does not perform any transmission but simply listens to the medium while on the look out for CBP packets and, possibly, BS SCH beacons.

It is important to note that to increase the effectiveness of CBP, downstream/upstream bandwidth allocations made by BS-to-CPEs in a certain frame should not change for a number of consecutive frames. This guarantees that the information carried in coexistence beacons is valid for at least a minimum duration of time, thus allowing enough time to the recipients of the coexistence beacon to implement self-interference mitigation mechanisms as are discussed below. Further, at any time when a BS must allocate bandwidth to a CPE, it should always seek to allocate this bandwidth based on the previous allocations, if any, to this CPE. That is, the BS should always allocate bandwidth to a CPE using approximately the same combination of slot and logical channel. This will reduce the number of coexistence beacons that need to be transmitted by this CPE, since its neighbors would already have the information regarding the allocations as these have not been changed by the BS. Other optimizations are also possible to improve the efficiency of the CBP, and make the transmission of coexistence beacons less frequent.

Once a CPE receives coexistence beacons from other collocated CPEs belonging to different cells, it can use this information in many ways in order to improve coexistence. The first thing a CPE may want to do is to convey to the BS the received information. The BS, in turn, will implement so-called "interference-free" scheduling algorithm, which schedules the various upstream/downstream traffic from and to CPEs in such a way that these allocations do not intersect with the allocations of this CPE's interfering with other CPEs. Another use of this information is for bandwidth request purposes. In this case, the CPE may include constraint elements when requesting upstream bandwidth allocation to the BS, thus providing the information the BS would need to avoid allocating time for this CPE which interferes with other collocated CPEs.

Yet another alternative is for the CPE not to send anything to the BS. Here, the BS would have to specifically send a Traffic Constraint Request (TRC-REQ) message to the CPE requesting for any constraints it might have regarding allocation. Other uses besides these are also possible.

As it is discussed later, CBP packets are used for multiple purposes in CMAC such as establishing and keeping synchronization, as well as for self-coexistence. Therefore, the process carried out at the BS to decide when and in which mode (i.e., passive or active) to schedule the Self-Coexistence IUC is mostly implementation dependent, while it is recommended that this be done every frame during normal operation.

CMAC is capable, however, of providing the necessary information to assist the BS in this decision process. In this case, it is recommended using the CPE statistics report as the basis for triggering the execution of CBP. For example, a decision criterion may be defined such that if the Packet Error Rate (PER) experienced by one or more CPEs (clustering can be used here) exceeds a predetermined threshold value per CBP, this would trigger the BS to schedule a Coexistence IUC for at least the corresponding CPEs.

Another simpler strategy for the BS is to implement a pseudo-random process wherein self-coexistence windows are statically scheduled with a certain frequency, but the mode (i.e., whether passive and active) is pseudo-random. This process is denominated pseudo-random in the sense that it can take into account other statistics in the decision process, such as traffic pattern.

The key aspect that undermines possibly all existing solutions for coexistence in reservation-based wireless systems is the lack of synchronization amongst co-channel overlapping BSs. Synchronization is a hard problem to be solved, but the benefits gained from having reliable synchronization are so significant that it is worth pursuing.

Traditionally, synchronization amongst overlapping BS has been a tackled through the backhaul. This simplifies both the PHY and MAC design, but it has as one of its major drawbacks the fact that it relies on third parties. In the particular case of IEEE 802.22, another critical drawback includes the fact that this technology is going to employ license-exempt operation, and hence the existence of a common backbone amongst competing operators serving a given location is very unlikely and cannot be assumed. This is further aggravated by the much longer coverage ranges that are expected from IEEE 802.22 cells.

Since coexistence is key in IEEE 802.22, synchronization becomes very critical in order to allow the IEEE 802.22 system to operate at its peak performance. In the case of IEEE 802.22, synchronization is beneficial both in the case of incumbent protection as well as for self-coexistence. In case of incumbents protection, synchronization is beneficial as it allows the quiet periods of overlapping BS to be synchronized. This will further enhance the incumbent detection probability, which can otherwise be compromised if overlapping occurs randomly. In the case of self-coexistence, synchronization will make the self-coexistence mechanisms much more effective, and hence provide efficient sharing of radio resources by overlapping IEEE 802.22 cells.

A mandatory scheme that allows overlapping BS to synchronize by aligning their frames in time addresses the problem with an over-the-air approach, in the sense that the scheme does not rely on any sort of fixed backhaul infrastructure. This is not to say, however, that the scheme cannot operate over the backhaul.

For any synchronization scheme to be effective, some constraints should be imposed on the overall frame timings. In the specific case of CMAC, superframes should have the same and fixed length in terms of time, or at a minimum should be an integral multiple of each other. Individual frames within a superframe should also have the same and fixed size, and at a minimum should be an integral multiple of each other. This will facilitate not only in establishing synchronization amongst overlapping cells, but, most importantly, will maintain synchronization with very low overheads.

Assume that no GPS device is available to the IEEE 802.22 BSs. If such device is available, synchronization may be accomplished by imposing an additional requirement that BSs should only initiate superframes at specific points in time.

An IEEE 802.22 cell should actively seek for other overlapping IEEE 802.22 cells in order to establish synchronization, as well as provide a technique by which other collocated cells can find it. Besides the capability that a CPE must be scanning for beacons whenever the CPE is not transmitting or receiving, two other mechanisms should also be used for this purpose which will considerably increase the probability of a successful synchronization: self-coexistence quiet periods and self-coexistence windows in both passive and active modes.

Besides quiet periods for the detection of incumbents, the BS should also schedule quiet periods for the purpose of self-coexistence, and these are hereby called as self-coexistence quiet periods. Typically, however, these quiet periods need not be as frequent as those for the detection of incumbents, although the BS has complete freedom to choose their occurrence. In practice, self-coexistence quiet periods could be scheduled during low peak hours, such as overnight, without causing any major impact on the system performance and responsiveness. During this time, both CPEs and the BS will search for CBP or SCH packets transmitted by overlapping IEEE 802.22 terminals belonging to other IEEE 802.22 cells. Whenever a BS powers up, it should never schedule self-coexistence windows in active mode (i.e., CBP transmissions) before at least one self-coexistence quiet period. This is done to ensure that, with high probability, a new IEEE 802.22 cell should first synchronize with any other collocated IEEE 802.22 cell before announcing its existence through CBP packets.

Figure 3:
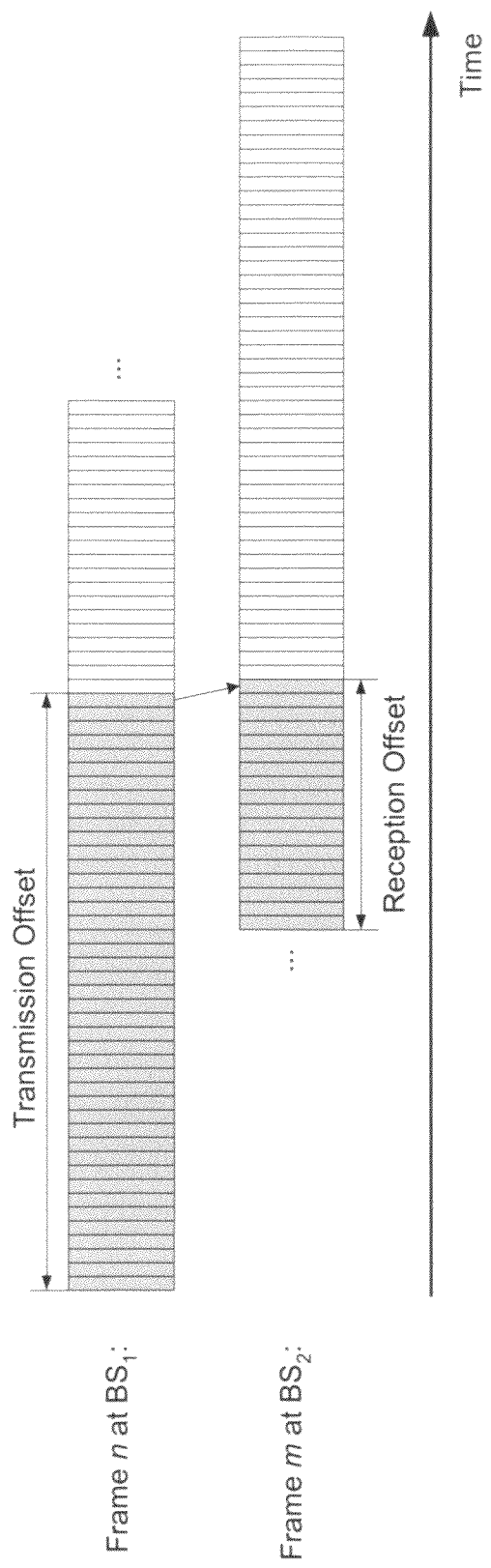
FIG. 3 illustrates a method for synchronizing overlapping base stations, which does not consider the propagation delay between the CBP transmitter and the CBP receiver.

Self-coexistence quiet periods should always be scheduled within the boundaries of a superframe, and should be scheduled in a random way to increase the probability that overlapping BSs successfully detect each other. The duration of a quiet period will typically be of one frame. The BS should randomly pick the frame number between [0, FS−1], while the superframe number should be derived from [0, NSTQP], where NSTQP is the Number of Superframes within an For every CBP or SCH packet received, the BS and CPEs should record the frame offset when they were received. Accuracy in this recording is critical for a successful synchronization. FIG. 3 depicts the relationship between the Transmission Offset and Reception Offset fields for a frame of size FS (in units of symbols), wherein the propagation delay between BS1 and BS2 is small enough to be negligible. The Transmission Offset is marked relative to the beginning of the (super) frame at the BS1, and the Reception Offset is marked relative to the beginning of the (super) frame at the BS2 in the FIG. 3. These fields are important for establishing synchronization between two overlapping cells.

In order for this fully distributed synchronization process to converge within an acceptable duration, a Convergence Rule should be employed by the BS before any synchronization attempt. The correct application of this convergence rule should guarantee network convergence in all scenarios. Mathematically speaking, BSi, responsible for cell i, should only attempt synchronization to BSj, responsible for a neighboring cell j, if and only if:

$$\left| \begin{array}{c} ((FS_i - \text{Frame\_Number}_i - 1) \times FDC_i + \\ (FDC_i - \text{Reception\_Offset})) - \\ ((FS_j - \text{Frame\_Number}_j - 1) \times FDC_j + \\ (FDC_j - \text{Transmission\_Offset}) \end{array} \right| \leq \frac{FS_i \times FDC_i \text{GuardBand} \times \text{SymbolSize}}{2} \quad (1)$$

where $\text{Frame\_Number}_i$ is the frame number in which the CBP packet was received, $\text{Frame\_Number}_j$ is the frame number in which the CBP packet was transmitted and should be −1 in the case of a SCH, GuardBand is the guard band to accommodate for, for example, propagation delay, FDC is the frame duration code, and FS is the number frames per superframe.

Given the requirement that FSi=FSj=FS and FDCi=FDCj=FDC, we can further simplify this equation to:

$$\left| (\text{Frame\_Number}_j - \text{Frame\_Number}_i) \times FDC + \text{Transmission\_Offset} - \text{Reception\_Offset} \right| \leq \frac{FS \times FDC + \text{GuardBand} \times \text{SymbolSize}}{2} \quad (2)$$

Incumbent Quiet Period. NSIQP can be easily derived from the TTQP field. By doing this, we are enforcing that the frequency of self-coexistence quiet periods should be the same as the incumbent quiet periods. Obviously, this can be dynamically changed by the BS if it can estimate an increment or decrement in the number of overlapping BSs (e.g., through PER statistics reported by CPEs or backhaul signaling).

Self-Coexistence windows should also be used for this purpose, and should always be scheduled by the BS at the end of the US subframe. The first key difference between self-coexistence quiet periods and self-coexistence windows is the time granularity. While the former will typically take at least an entire frame, the latter happens within part of a frame. The second, and probably most significant, difference is that during the self-coexistence quiet periods CPEs and the BS do not perform any type of transmission, but only sense the channel. During self-coexistence windows, however, CPEs can transmit CBP packets if so scheduled by the BS (in the case of self-coexistence in active mode). A decision processes can be used at the BS to determine whether to schedule a passive or active self-coexistence period.

Therefore, BSi should apply this convergence rule to each and every synchronization alternative available. Only those that satisfy this rule can proceed to the next phase.

Even after the convergence rule is applied to all possible synchronization alternatives, although unlikely, multiple choices may still remain that satisfy the convergence rule. The BS should attempt synchronization with each overlapping BS, one at a time. Unless the BS realizes that it is already synchronized with the overlapping network corresponding to the selected packet (i.e., with Slide Amount equal to 0 or FS—see below—, or through bookkeeping), the BS should immediately construct and transmit a FSL-REQ message as a broadcast to all CPEs in the cell, and should not schedule any additional active mode self-coexistence interval until the scheduled time of the frame slide.

In constructing the FSL-REQ message, the Slide Count and Slide Amount fields should be configured as depicted in FIG. 125. Slide Count should be equal to the number of frames right before the start of the superframe of the overlapping BSs, and Slide Amount will be equal to the number of slots to the start of the overlapping BS' superframe. More specifically, the Slide Amount field and Direction fields in the FSL-REQ message should be set according to the following rules:

$$\text{Slide Amount} = \begin{cases} FDC - \text{Transmission\_Offset} + \text{Reception\_Offset, if} & (3) \\ \left(FDC - \text{Transmission\_Offset} + \text{Reception\_Offset} \le \left\lceil \frac{FDC}{2} \right\rceil\right) \text{(Case 1)} \\ \text{Transmission\_Offset} - \text{Reception\_Offset, otherwise (Case 2)} \end{cases}$$

$$\text{Direction} = \begin{cases} 0(\text{Right}), & \text{if (Case 1)} \\ 1(\text{Left}), & \text{otherwise (Case 2)} \end{cases} \quad (4)$$

On the CPE side, it should report back to the BS on any received CBP or SCH packets, unless it receives a FSL-REQ message from the BS in the meantime in which case it should terminate the self-coexistence procedure and return to normal operation. Regardless of whether it was the BS itself who detected the CBP or SCH packets, or if these were received as a result of a CPE report, the BS should proceed in the same way as described above in attempting synchronization. The key difference at the BS is that the CPEs who received the same SCH and CBP packets will report different values for the Reception Offset due to the fact that they experience different propagation delays. In this case, it is up to the discretion of the BS to select one of the packets, as these refer to the same network. To cope up with the different propagation delays, which consists essentially of allowing guard bands in Equation (1) and Equation (2).

Whenever sliding the frame to the left or to the right, the BS always should adopt the same behavior. That is, at the scheduled slide time the BS should initiate transmission of a new superframe (shown in FIG. 4). So that the frame slide does not disrupt any data communication, the BS scheduler should take this slide into account when scheduling US and, DS transmissions.

Figure 4:
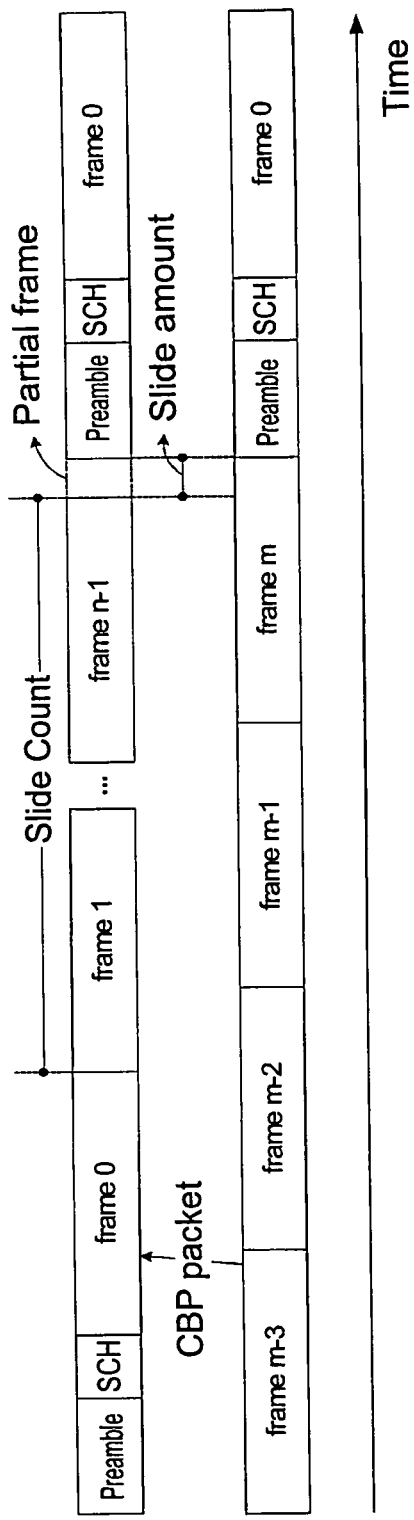
FIG. 4 illustrates establishment of synchronization between overlapping base stations.

The frame slide operation may result in a partial frame as indicated in FIG. 4. It is up to the BS to use this partial frame as it sees fit. For example, the BS could use this time as a quiet period. Another possibility is that the scheduler at the BS has the capability to schedule data transmissions during this time, and so airtime is not wasted. Yet another option would be to keep this partial frame as idle time, which may be a simple strategy whenever the partial frame size is only a few slots.

Once synchronization is accomplished, maintenance is a simpler process. Once the FSL-REQ message goes into effect and the frame is shifted, the BS should schedule self-coexistence windows with a certain periodicity and always at the end of the US subframe.

Figure 5:
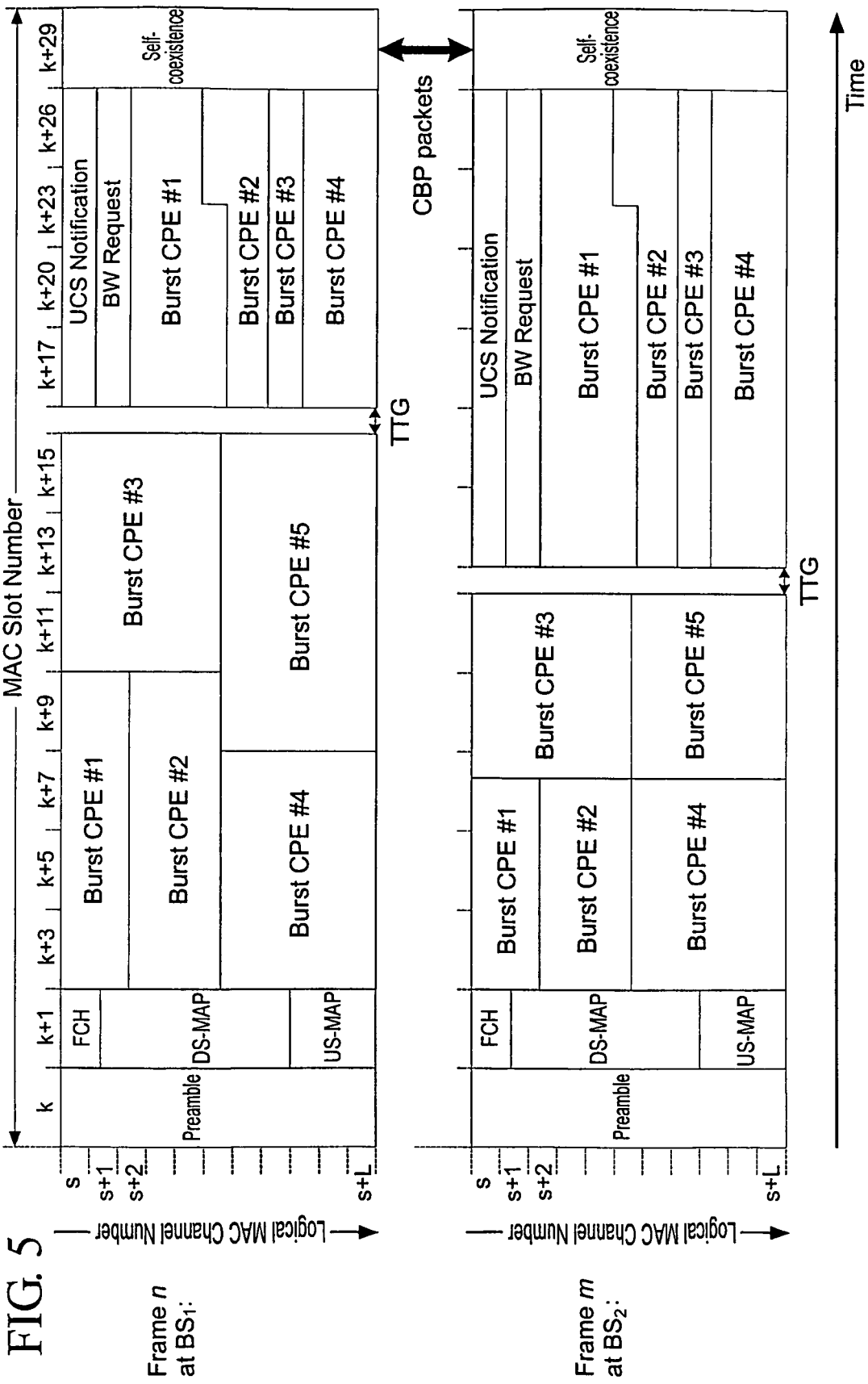
FIG. 5 illustrates communication between two synchronized overlapping cells.

Confirmation and maintenance of synchronization is performed through periodic CBP packet transmissions and receptions during self-coexistence windows. Once the first CBP packet is successfully received from the overlapping cell, synchronization is completed and confirmed. At this point, the BS should continue to schedule self-coexistence windows, but now with the main purpose of better self-coexistence through the exchange of traffic constraints. Of course, a positive side effect of the transmission and reception of CBP packets is that the overlapping cells can more easily remain synchronized. This will, in effect, provide the most performance gains for all synchronized IEEE 802.22 cells. FIG. 5 shows an example of how two synchronized 802.22 cells communicate over the air through the self-coexistence window.

Given the large propagation delays in an IEEE 802.22 network, synchronization from the point of view of the BS does not mean exact synchronization for all CPEs. This is due to the different propagation delays experienced by different CPEs. To account for this disparity in propagation delays, and to accommodate the preamble transmission and the contention backoff interval, the BS should schedule self-coexistence windows with an appropriate guard band, which is recommended to be at least three slots. In this way, the BS can provide a guard band and take into account the worst scenario for the transmission/reception of at least one CBP packet.

If a frame slide in a cell is the result of a report from one or more CPEs, together with the BS, these CPEs should be responsible for keeping track of the synchronization. During the maintenance phase, the CPEs should periodically transmit/receive CBP packets to/from the synchronized cell in order to confirm continued synchronization. During this time, the CPE should not report to the BS on each and every CBP packet received. Rather, it should restrict its control information exchange with the BS to only those control information exchanges that are needed for better self-coexistence and to implement "interference-free scheduling".

Figure 6:
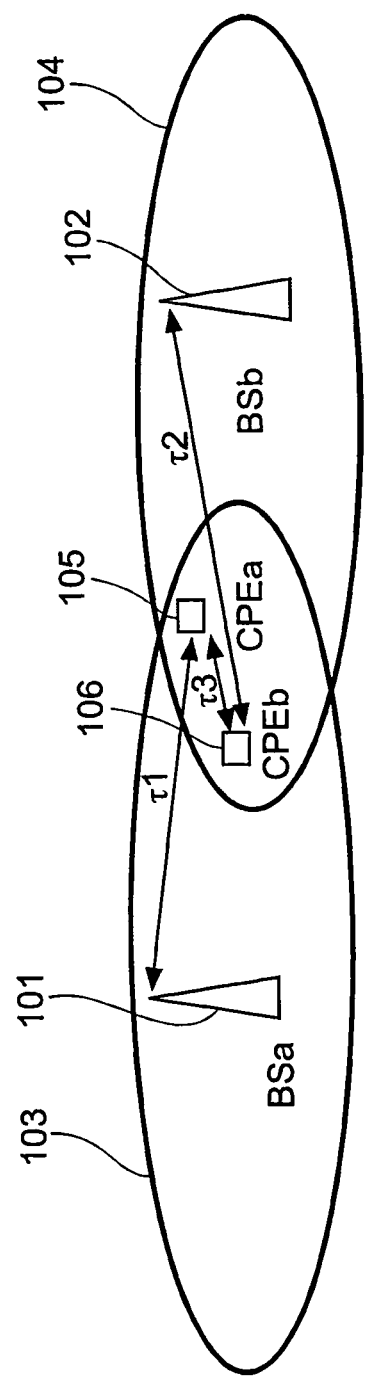
FIG. 6 illustrates a scenario for coexistence transmission.

In a method of synchronization as shown in FIG. 6, CPE_a 105 transmits a CBP, which is contained in a superframe. In addition, CPE_a 105 marks a "transmission offset" (Tx offset) of the CBP packet relative to the beginning of the superframe in Cell_a 103. The information of the transmission offset can be delivered by the CPE_a 105 (or BS_a 101). The transmission offset may include the information in MAC header, or information elements, or Protocol Data Unit (PDU) of the CBP packet, or predefined signal. The transmission offset can indicate the offset (in units of slots) relative to the start of the first slot of the PHY PDU (including preamble) where the current frame is transmitted. After detecting the CBP packet, CPE_b 106 marks a "reception offset" (Rx offset) relative to the beginning of the superframe in Cell_b 104. CPE_b 106 reports this event to BS_b 103. Given the following two assumptions: (1) both of the transmission offset and the reception offset are for cell wide; and (2) propagation delay between CPE_a 105 and CPE_b 106 is negligible, BS_b 102 knows the difference between the transmission offset and the reception offset, thus aligning the superframe timing in Cell_b with that of Cell_a. For the first assumption, even though the CBP packet is transmitted by CPE_a 105, CPE_a 105 already makes sure the transmission offset is relative to BS_a 101. Therefore, BS_b 102 can always assume this transmission offset is defined relative to BS_a 101. The same concept applies for the reception offset. Namely, although the reception offset is measured by CPE_b 106 and is reported to BS_b 102, BS_b 102 can always make sure that the reception offset is defined relative to itself, because either BS_b 102 or CPE_b 106 could consider the propagation delay between them so that the final reception offset is relative to BS_b 102. This is typically achieved by the ranging process. In other words, no matter how the CBP packet is transmitted and received, both of the transmission offset and the reception offset are assumed to be relative to the corresponding base stations.

Figure 7:
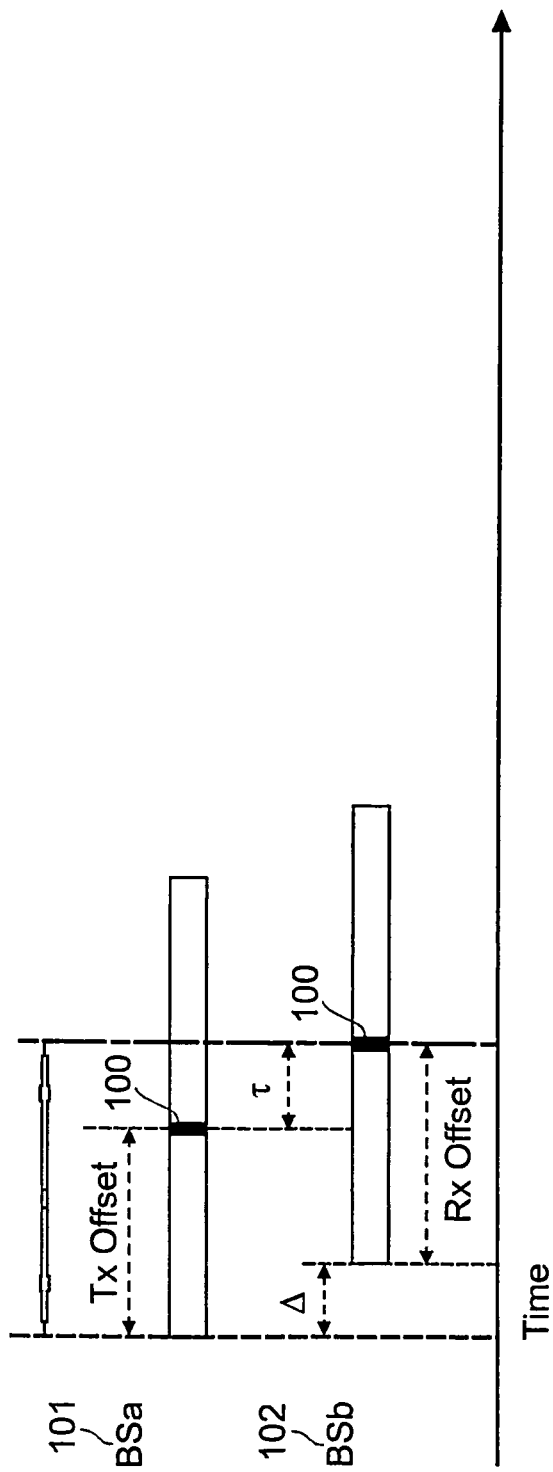
FIG. 7 illustrates method for precisely synchronizing overlapping cells.

Another example method of synchronization of overlapping cells is shown in FIG. 7. As shown in FIG. 7, there is no CPE involved. BS_a 101 directly transmits a CBP packet 100 to BS_b 102. CBP packet 100 is transmitted by BS_a 101 at the transmission offset and is received by BS_b 102 after the propagation delay τ. BS_b 102 measured the reception offset. The sum of the transmission offset and the propagation delay r equals to the sum of the reception offset and the frame slide Δ. Although the propagation delay between the CBP transmitter and the CBP receiver, i.e. τ, is very small in the FIG. 3, the propagation delay τ is large enough and may not be negligible in this case. Without the knowledge of the propagation delay τ between the CBP transmitter and the CBP receiver, BS_b 102 cannot calculate the frame slide Δ, and thus BS_b 102 cannot synchronize its transmission with BS_a. Therefore, the synchronization accuracy is directly limited by this kind of propagation delay. In other words, the second assumption is not always legitimate. If the distance between the two base stations is 30 Km, the propagation delay could be about 100 μsec. As another case, BS_b could pick up the CBP packet from CPE_a directly. In this case, the propagation delay could easily be tens of microseconds, e.g., 10 Km cell radius could incur 33 μsec synchronization error.

Figure 8:
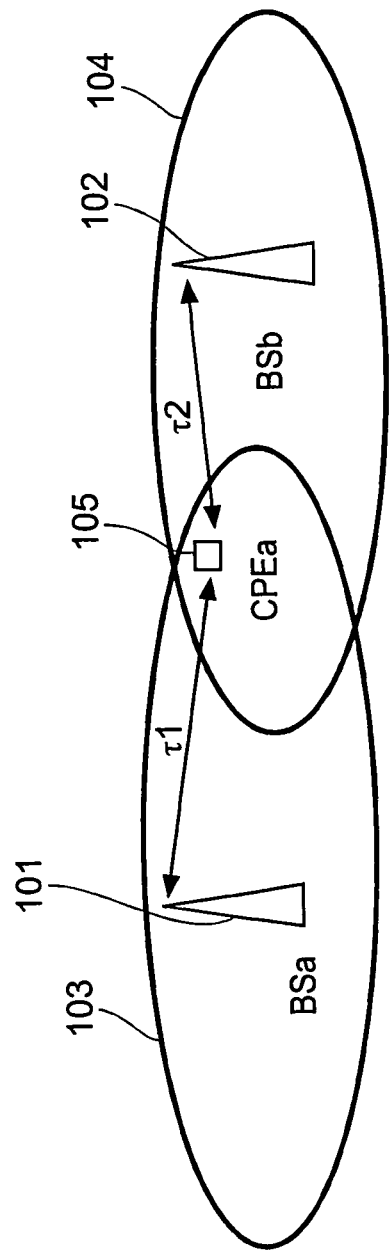
FIG. 8 illustrates another scenario for coexistence transmission.

Another scenario of coexistence transmission is illustrated in FIG. 8, where CPE_a 105 is located in an overlapping area between Cell_a 103 covered by BS_a 101 and Cell_b 104 covered by BS_b 102. CPE_a 105 transmits a CBP packet in response to the direction of BS_a 101. BS_b 102 receives the CBP packet. The propagation delay between BS_a 101 and CPE_a 105 is τ1, while the propagation delay between BS_b 102 and CPE_a 105 is τ2. Using the existing method, the synchronization error could easily be tens of microseconds. Therefore, BS_b 102 cannot synchronize its transmission with BS_a 101 without the knowledge of propagation delay τ2.

The present invention provides a method for precise network synchronization by considering propagation delay when transmitting the CBP packet.

When two base stations (BSs) synchronize with each other, the propagation delay between the two BSs has to be calculated and cancelled out. This could be done through provisioning, e.g., BSa and BSb could get the location of both of them from a central database. The alternative method is to include the location information of the transmitter in the CBP packet. The receiver should know its own location already.

When the transmitter for the CBP packet is a CPE, the receiver could be a CPE or a BS. Then the propagation delay might be addressed by transmit-feedback handshaking.

It should be mandatory to require a BS to know the locations of neighboring BSs in order to support cell synchronization over the air. This information could be acquired through provisioning during cell installation. But, there may be an issue if cells from different vendors are required to be synchronized, when the vendors do not want to share the location information.

The other solution would be to include the message of the location of a BS at each SCH transmitted by the BS, so that a neighboring BS can calculate and cancel out the propagation delay between the BS and the neighboring BS to achieve cell synchronization. A problem with this method is that each SCH has to carry the overhead with the message of location.

In any case of this invention, propagation delay is considered when synchronizing overlapping cells.

In an embodiment according to the present invention, the transmitter transmits a CBP packet carrying location information of the transmitter, so that the receiver can calculate and cancel out the propagation delay to achieve cell synchronization. The location information can be delivered by SCH (Superframe Control Header) which includes location configuration Information Element (IE), or by CBP which includes location IE. Then the receiver can report the calculated propagation delay to the BS which covers or services the receiver. Alternatively, the receiver may report the location information of the transmitter to the BS which covers or services the receiver, and the BS may calculate the propagation delay based on the location information. If the BS also needs to know location information of the receiver, then the receiver is able to transmit the location information of both the receiver and the transmitter. This method requires the transmitters to have a location solution using, for example, the Global Positioning System (GPS).

If a location database is available, the transmitter ID, rather than the exact location could be included in the CBP message. Then the receiver can retrieve the location of the transmitter from the location database using the ID.

In addition, the overhead of including location information in CBP message could be cut short, given that the receiver knows the exact location of the receiver, and the receiver knows the transmitter is within a certain radius (e.g., the transmitter and the receiver is within 50 Km from each other). In other words, only the least important bits may be enough for inferring the exact location of the transmitter.

In another embodiment according to the present invention, the transmitter measures inter-cell delays using two-way communication and carries the information regarding the propagation delays in the CBP packet. The inter-cell delay may be τ3 in the scenario illustrated in FIG. 6, or τ2 in the scenario illustrated in FIG. 8. In this method, a new transmission procedure is needed for measuring the inter-cell delay no matter the inter-cell delay occurs between two CPEs, or between a BS and a CPE. Basically, the measurement requires an immediate follow-up transmission in order to measure the propagation delay.

Figure 9:
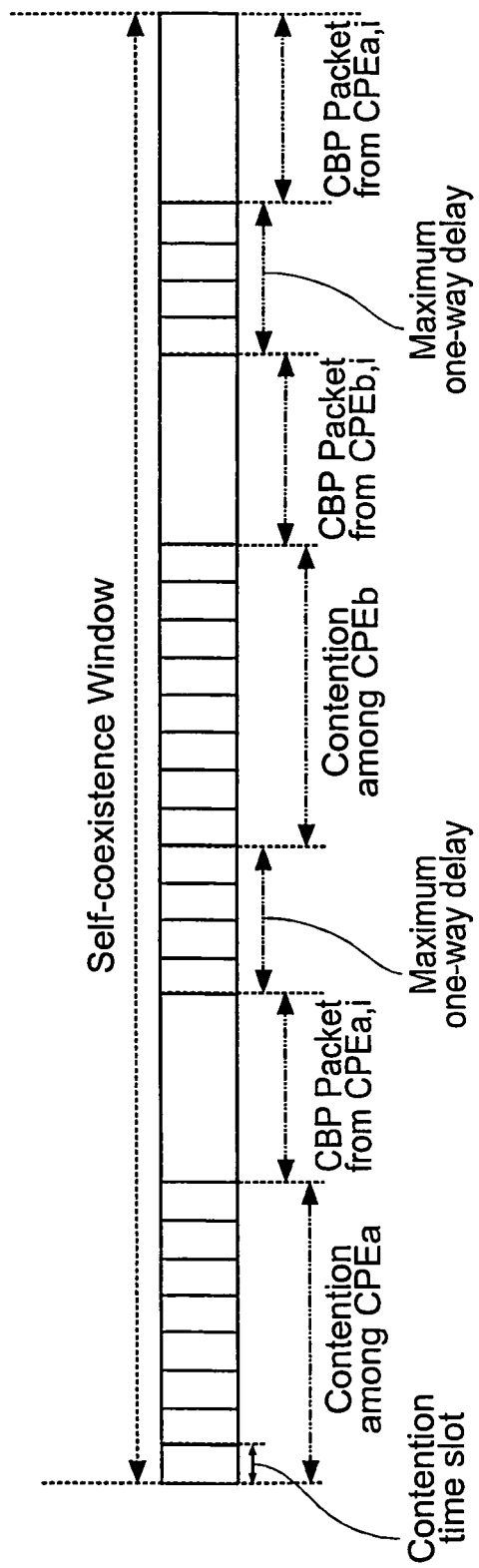
FIG. 9 illustrates a method for synchronizing overlapping cells according to an embodiment of the present invention.

As illustrated in FIG. 9, CBP packets are scheduled by BSs through a Self-Coexistence window. The Self-Coexistence window defines a period of time where channel access is contention bases, in order to maximize spectrum usage. In other words, during this time, CPEs should use the contention access mechanism to gain access to the medium and transmit the CBP packet. First, BS_a selects some CPEs (e.g., CPE_a1, CPE_a2 and CPE_a3) for transmitting a CBP packet in a contention manner (e.g., with the contention window of [0~7]). That is, CPE_a1, CPE_a2 and CPE_a3 contend for the transmission of the CBP packet. Alternatively, BS_a may assign only one CPE (e.g., CPE_a1) to transmit the CBP packet. BS_b selects some CPEs (e.g., CPE_b1, CPE_b2 and CPE_b3) for receiving the CBP packet. Whoever has received the CBP packet should send a follow-up message (i.e., another CBP packet) again in a similar contention manner. In other words, CPE_b1, CPE_b2 and CPE_b3 contend for the transmission of the follow-up message. The original CBP transmitter receives the feedback (i.e., the follow-up message) and calculates the propagation delay between the transmitter and the receiver. As a result, precise cell synchronization is established. Optionally, the CPE_ai which won the contention for transmitting the first CBP packet may transmit another follow up message to the CPE_bi.

Figure 10:
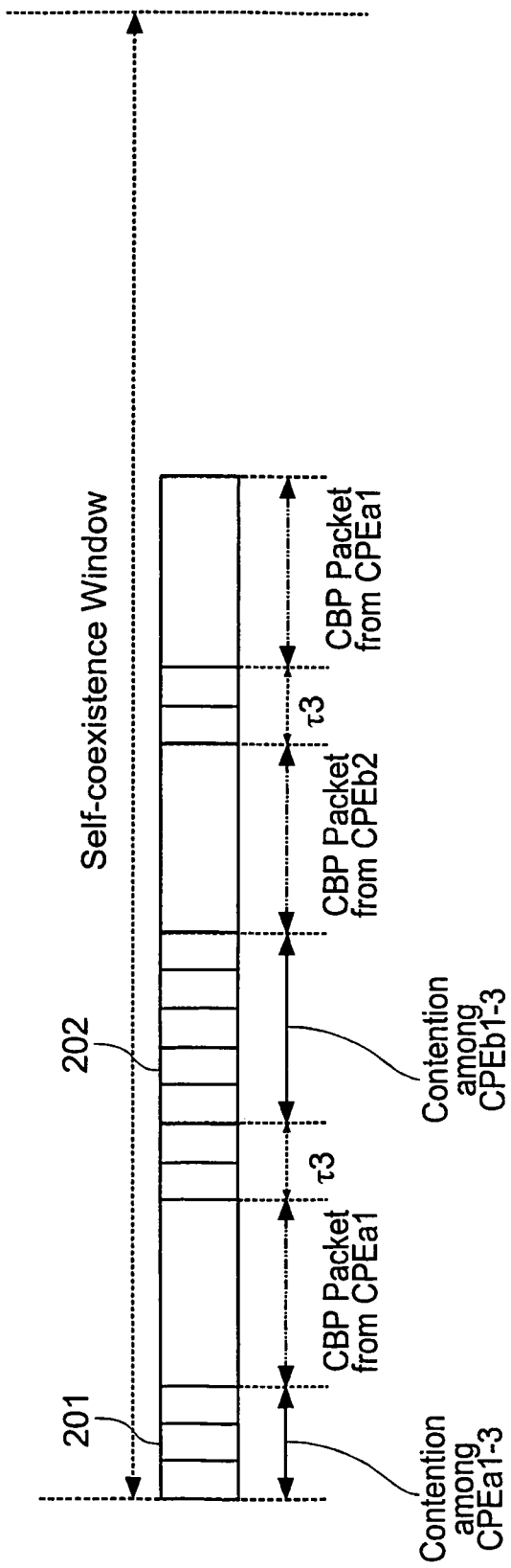
FIG. 10 illustrates a specific example for synchronizing overlapping cells.

One example of this process is illustrated in FIG. 10, where BS_a selects CPE_a1, CPE_a2 and CPE_a3 located in cell_a to content for transmitting a first CBP packet in contention window 201. As a result of the contention, CPE_a1 wins the contention and transmits a first CBP packet at time $t_0$. The packet reaches the CPE_b's (e.g., CPE_b1, CPE_b2 and CPE_b3) in cell_b after a certain propagation delay, shown as 3 in the figure, at slightly different time. Suppose at time $t_1$ CPE_b2 receives the packet. After receiving the first CBP packet, CPE_b1, CPE_b2 and CPE_b3 content for the transmission of a second CBP packet (i.e., follow up message) in contention window 202. As a result of the contention, CPE_b2 wins the contention and transmits the second CBP packet at time $t_2$. This packet reaches CPE_a1 after a certain propagation delay, shown again as $\tau_3$ in the figure. That is, at time $t_4$, CPE_a1 receives the second CBP packet. Note that the other CPE_as in cell_a might also receive the second CBP packet, but they cannot use the second CBP packet for calculating the propagation delay because they did not transmit the first CBP packet. CPE_a1 calculates the propagation delay between CPE_a1 and CPE_b2; the resulted propagation delay is $(t_4-t_0)/2$. As a result, precise cell synchronization is accomplished. As an alternative embodiment, the first CBP transmitter, i.e., CPE_a1 may send another follow-up message, i.e., a third CBP packet at time $t_5$. Suppose CPE_b2 receives this third CBP packet at t6. Then CPE_b2 could calculate the propagation delay between CPE_b2 and CPE_a1; the resulted propagation delay is $(t_6-t_2)/2$.

In addition, BSs and CPEs could have a certain processing delay in transmitting and receiving CBP and SCH packets. These kinds of delay should be compensated if they are substantial. Generally, they won't be in practice. Specifically, the propagation delay between CPE_a and CPE_b is calculated using the round-trip communication. At $t_0$ CPE_a transmits a packet, at $t_1$ CPE_b receives the packet, at $t_2$ CPE_b transmits another packet, at $t_3$ CPE_a receives the packet. After the process, CPE_a measures $t_3-t_0$ The value of $t_2-t_0$ is the processing delay at CPE_b. If the processing delay is negligible, then the value $t_3-t_0$ is the round-trip propagation delay between CPE_a and CPE_b. The one-way propagation delay between CPE_a and CPE_b equals to the half of the round-trip propagation delay. Therefore, $t_2-t_1$ affect the precision of the propagation delay, and thus the precision of the inter-BS synchronization. Generally speaking, this processing delay is negligible if we are talking about obtaining the precision of 25 µs for inter-BS synch As described above, propagation delays need to be measured and reported in CBP messages for synchronizing overlapping cells. Intra-cell delay can be measured by the ranging process. That is, all the CPEs in a cell align their transmission by the coordination of the BS via the ranging process. In other words, the BS measures the propagation delay of each CPE relative to the BS. Therefore, in the scenario as shown in FIG. 8, $\tau_1$ is known by regular 'ranging' process between BS_a 101 and CPE_a 105, but, $\tau_2$ is not known because CPE_a 105 is not associated with BS_b 102. Similarly, in the scenario as shown in FIG. 6, $\tau_1$ and $\tau_2$ are known, whereas $\tau_3$ is not known.

As shown in the FIG. 7, the transmission offset is relative to BS_a 101, and the reception offset is relative to BS_b 102, even though the transmitter and receiver of the CPE packets might be CPEs. The reason is that the propagation delay between BSa and CPEa, BSb and CPEb are known, and are removed in the equations.

What is claimed is:

1. A method for synchronizing overlapping cells, the method comprising:
    receiving, from a first customer premise equipment (CPE), a first data packet and a transmission offset indicating the difference in a time domain between the beginning of a transmission data frame and the first data packet, wherein the first CPE is located in a first cell covered by a first base station;
    receiving, from a second CPE located in a second cell covered by a second base station, a reception offset recorded in response to the reception of the first data packet and indicating the difference in time domain between the beginning of a frame at the second base station and the first data packet, the second CPE different than and physically separated from the first CPE;
    obtaining a propagation delay between the first CPE served by the first base station and the second CPE served by the second base station;
    calculating, at the second base station, a frame slide by adding the transmission offset and the propagation delay, and subtracting the reception offset; and
    synchronizing the first base station and the second base station based upon the calculated frame slide,
    wherein the obtaining of the propagation delay between the first CPE and the second CPE comprises:
        receiving, from the first CPE, a second data packet carrying information regarding the geographical location of the first CPE; and
        receiving, from the second CPE, the propagation delay of the first data packet calculated in response to reception of the second data packet based on the information regarding the location of the first CPE.

2. The method of claim 1, comprising, when a geographic location of one of the first CPE and the second CPE is unknown, calculating the propagation delay between the first CPE and the second CPE using round-trip communication information without regard to the geographical location of the first CPE.

3. The method of claim 1, wherein obtaining the propagation delay between the first CPE and the second CPE comprises:
    generating location information including geographical location information of a plurality of CPEs located within the first cell, wherein the location information is associated with corresponding identifiers;
    broadcasting the generated location information;
    receiving from the first CPE the first data packet carrying an identifier of the first CPE; and
    receiving, from the second CPE, a propagation delay calculated in dependence upon the geographical location information of the first CPE determined in response to the reception of the first data packet from the broadcast location information using the corresponding identifier for the first CPE.

4. The method of claim 1, wherein obtaining the propagation delay between the first CPE and the second CPE comprises:
    selecting, by the first base station, a subset of first CPEs for data transmission, wherein the first CPEs are located in the first cell covered by the first base station;
    indicating a certain one of the first CPEs that may transmit a first reference data packet in a first time interval in response to a first contention, by the subset of first CPEs, for a right to transmit a first reference data packet in a first time interval;
    receiving, from the certain one of the first CPEs which won the first contention, the first reference data packet;
    selecting, by the second base station, a subset of second CPEs for data reception, wherein the second CPEs are located in the second cell covered by the second base station;
    in response to reception of the first reference data packet, indicating a certain one of the first CPEs that may transmit a first reference data packet in a first time interval in response to a second contention, by the selected subset of second CPEs, for a right to transmit a second reference data packet in a second time interval;

receiving, from the certain one of the second CPEs which won the second contention, the second reference data packet; and receiving, from the certain one of the first CPEs, a propagation delay between the certain one of the first CPEs and the certain one of the second CPEs calculated by the certain one of the first CPEs.

5. The method of claim 4, further comprising receiving a third reference data packet from the certain one of the first CPEs.

6. The method of claim 4, further comprising compensating a processing delay of the first data packet when establishing base station synchronization for the certain one of the first CPEs.

7. The method of claim 1, wherein obtaining the propagation delay between the first CPE and the second CPE comprises:
scheduling, by the first base station, the first CPE to transmit a first reference data packet;
scheduling, by the second base station, the second CPE to receive the first reference data packet;
scheduling, by the second base station, the second CPE to transmit a second reference data packet; and
receiving, from the first CPA, a propagation delay of the reference data packet calculated by the first CPE in response to reception of the second reference data packet.

8. The method of claim 7, further comprising receiving a third reference data packet receiving the first CPEs.

9. The method of claim 1, wherein the first cell and the second cell overlap.

10. A wireless communication system, comprising:
a first base station configured to:
schedule a selected one of a plurality of first CPEs located within a first cell to transmit a first data packet as part of a transmission data frame, the first base station corresponding to the first cell,
wherein the selected one of the first CPEs is configured to transmit a transmission offset indicating a difference in a time domain between a beginning of the transmission data frame and the first data packet,
wherein a selected one of a plurality of second CPEs located in a second cell is configured to record a reception offset in response to reception of the first data packet, the reception offset indicating a difference in the time domain between a beginning of a data frame received at the second cell and reception of the first data packet,
wherein the second CPE different than and physically separated from the first CPE,
wherein the selected one of the second CPEs is configured to transmit the reception offset to a second base station corresponding to the second cell, and
wherein the second base station is configured to:
obtain a propagation delay between the selected one of the first CPEs served by the first base station and the selected one of the second CPEs served by the second base station;
calculate a frame slide by adding the transmission offset and the propagation delay and subtracting the reception offset; and
synchronize the first base station and the second base station based upon the calculated frame slide,
wherein the obtaining of the propagation delay by the second base station comprises:
the one of the first CPEs located in the first cell configured to transmit a second data packet carrying information regarding the geographical location of the one of the first CPEs, and
the one of the second CPEs located in the second cell configured to calculate the propagation delay of the data packet in dependence upon the information regarding the geographical location of the transmitter in response to reception of the second data packet, and to transmit the propagation delay to the second base station.

11. The wireless communication system of claim 10, comprising, when the one of the second CPEs has knowledge of geographical location of itself, the one of the first CPEs configured to transmit the second data packet carrying information regarding a distance between the one of the first CPEs and the one of the second CPEs.

12. The wireless communication system of claim 10, the second base station is configured to obtain the propagation delay between the selected one of the first CPEs and the selected one of the second CPEs, the system further comprising:
a global positioning system configured to generate location information including geographical location information of a plurality of first CPEs located within the first cell, wherein the location information is associated with corresponding identifiers; and
broadcast the generated location information,
wherein the one of the first CPEs is configured to transmit a second data packet carrying an identifier of the one of the first CPEs,
wherein the one of the second CPEs is configured to retrieve the geographical location information of the one of the first CPEs from the location database in dependence upon the identifier in response to the reception of the second data packet, to calculate at a propagation delay in dependence upon the information regarding the location of the one of the first CPEs, and to transmit the propagation delay to the second base station.

13. The wireless communication system of claim 10, wherein the second base station is configured to obtain the propagation delay between the selected one of the first CPEs and the selected one of the second CPEs wherein the first base station is configured to select a subset of first CPEs in contention for a right to transmit a first reference data packet in a first time interval, and to receive, from a certain one of the first CPEs which won the contention, the first reference data packet,
wherein the second base station is configured to:
select a subset of second CPEs in contention for a right to transmit a second reference data packet in a second time interval; and
to receive, from a certain one of the second CPEs which won the contention, the second reference data packet and to receive a propagation delay between the certain one of the first CPEs and the certain one of the second CPEs calculated by the certain one of the first CPEs.

14. The wireless communication system of claim 13, wherein the first base station is configured to receive a third reference data packet from the certain one of the first CPEs.

15. The wireless communication system of claim 10, wherein the first base station is configured to compensate for a processing delay of the first data packet when establishing base station synchronization.

16. The wireless communication system of claim 10, the second base station is configured to obtain the propagation delay between the selected one of the first CPEs and the selected one of the second CPEs wherein the first base station is configured to schedule the one of the first CPEs to transmit a first reference data packet, and wherein the second base station is configured to schedule the one of the second CPEs to receive the first reference data packet, to schedule the one of the second CPEs to transmit a second reference data packet, to receive a propagation delay of the reference data packet calculated in response to reception of the second reference data packet at said one of the first users the propagation delay to the second base station.

17. The wireless communication system of claim 16, wherein the first base station is configured to receive a third reference data packet from one of the first CPEs.

18. The wireless communication system of claim 10, wherein the first cell and the second cell overlap.

19. A method for synchronizing base stations with overlapping cells, the method comprising:

receiving, from a first CPE, a first data packet with location information of the first CPE and a transmission offset indicating the difference in a time domain between the beginning of a transmission data frame and the first data packet in a first base station corresponding to a first cell, wherein the first data packet is received by a second CPE which records the location information of the first CPE and a reception offset indicating the difference in a time domain between a beginning of a data frame and reception of the first data packet in a second base station corresponding to a second cell, the second CPE different than and physically separated from the first CPE; and obtaining a propagation delay between the first CPE served by the first base station and the second CPE served by the second base station based on the recorded location information of the first CPE, and wherein a frame slide is calculated by adding the transmission offset and the propagation delay and subtracting the reception offset, wherein the obtaining of the propagation delay between the first CPE and the second CPE comprises:

receiving, from the first CPE, a second data packet carrying information regarding the geographical location of the first CPE; and receiving, from the second CPE, the propagation delay of the first data packet calculated in response to reception of the second data packet based on the information regarding the location of the first CPE.

20. The method of claim 19, further comprising synchronizing the first base station and the second base station based upon the calculated frame slide.

21. The method of claim 19, wherein the first CPE is located in the first cell covered by a first base station, and the second CPE is located in the second cell covered by a second base station.

22. A wireless communication system comprising:

a first base station constituting a first cell; and a second base station constituting a second cell, wherein the second base station is configured to be synchronized with the first base station by:

receiving from a first CPE a first data packet with location information of the first CPE and a transmission offset indicating a difference in a time domain between a beginning of a transmission data frame and the first data packet in the first base station corresponding to the first cell, wherein the first data packet is received by the second CPE, which records the location information of the first CPE and a reception offset indicating the difference in the time domain between the beginning of a frame and reception of the first data packet in the second base station corresponding to the second cell, the second CPE different than and physically separated from the first CPE;

obtaining a propagation delay between the first CPE served by the first base station and the second CPE served by the second base station based on the recorded location information of the first CPE; and calculating a frame slide by adding the transmission offset and the propagation delay and subtracting the reception offset, wherein the obtaining of the propagation delay by the second base station comprises:

the one of the first CPEs located in the first cell configured to transmit a second data packet carrying information regarding the geographical location of the one of the first CPEs, and the one of the second CPEs located in the second cell configured to calculate the propagation delay of the first data packet in dependence upon the information regarding the geographical location of the transmitter in response to reception of the second data packet, and to transmit the propagation delay to the second base station.

23. The wireless communication system of claim 22, wherein the first CPE is located in the first cell covered by the first base station, and the second CPE is located in the second cell covered by the second base station.

* * * * *